United States Patent [19]

Richter

[11] Patent Number: 4,808,198
[45] Date of Patent: Feb. 28, 1989

[54] ENVIRONMENTALLY SAFE METHOD FOR DISPOSING OF ASBESTOS CONTAINING MATERIALS

[75] Inventor: George N. Richter, San Marino, Calif.

[73] Assignee: Texaco Inc., White Plains, N.Y.

[21] Appl. No.: 150,678

[22] Filed: Feb. 1, 1988

[51] Int. Cl.$^4$ .............................................. C10J 3/46
[52] U.S. Cl. ...................................... 48/197 R; 48/215; 48/DIG. 2; 208/127; 252/373
[58] Field of Search ............. 252/373; 48/197 R, 206, 48/209, 210, DIG. 2, 212; 208/127, 126; 423/DIG. 18

[56] References Cited

U.S. PATENT DOCUMENTS

| 4,615,285 | 10/1986 | Pentell et al. | 48/197 R |
| 4,692,172 | 9/1987 | Stelloecio | 48/197 R |
| 4,705,429 | 11/1987 | Natale | 423/DIG. 18 |
| 4,705,528 | 11/1987 | Nayjai et al. | 48/197 R |

*Primary Examiner*—Peter Kratz
*Attorney, Agent, or Firm*—Robert A. Kulason; James J. O'Loughlin; Albert Brent

[57] ABSTRACT

Asbestos-containing hazardous waste materials are known causes of cancer and other serious diseases. By the subject process, asbestos-containing wastes are rendered harmless by altering the physical form of the fibers, by (i) melting the asbestos, and by (ii) incorporating the molten asbestos into the slag phase produced by the partial oxidation of ash-containing liquid hydrocarbonaceous fuel and/or solid carbonaceous fuel. Further, gaseous mixtures comprising $H_2+CO$ e.g. synthesis gas, reducing gas, or fuel gas, are simultaneously produced.

15 Claims, No Drawings

ENVIRONMENTALLY SAFE METHOD FOR DISPOSING OF ASBESTOS CONTAINING MATERIALS

FIELD OF INVENTION

This invention pertains to an environmentally safe method for disposing of asbestos-containing materials. More particularly, it pertains to a process for the partial oxidation of a liquid hydrocarbonaceous fuel and/or solid carbonaceous fuel in combination with asbestos for the production of gaseous mixtures comprising $H_2$ and CO with entrained molten slag comprising the ash from said fuel in combination with said asbestos whose physical form has been rendered harmless.

One of the hazardous wastes of greatest concern today is asbestos. Asbestos is often found as a waste material, both in a relatively pure form, or as a constituent in mixtures. Asbestos has been widely used for insulation against heat and as a filler to reinforce plastics. It does not decompose or deteriorate.

Asbestos is now a known cause of cancer and other serious diseases. Many health experts warn that asbestos that appears stable today can crumble tomorrow into particles small enough to be inhaled into the lungs. By 1980, an estimated 100,000 people have died from industrial exposure to asbestos. Millions of buildings contain potentially dangerous asbestos. The Labor Department's Occupational Safety and Health Administration has adopted a rule requiring employers in industries that use asbestos to reduce the levels to no more than two-tenths of a fiber per cubic centimeter of air in the workplace. Public and commercial buildings may soon be put under similar regulations. Removal of asbestos-containing materials from buildings and disposing of it without polluting the environment is absolutely necessary. Lawsuits filed by those claiming to have fallen victim to asbestos now number an estimated 60,000 and are rising by some 12,000 a year.

Asbestos is hazardous not because of chemical toxicity, but because of its physical nature. It is primarily an inhalation hazard and, the reasons for its adverse affect on health are the size and shape of the fibers. By the subject process, asbestos-containing wastes are rendered harmless by altering the physical form of the fibers, by (i) melting the asbestos, and by (ii) incorporating the molten asbestos into the slag phase produced by the partial oxidation of ash-containing liquid hydrocarbonaceous fuel and/or solid carbonaceous fuel. The chemical nature of the asbestos is not necessarily altered. By the subject invention, asbestos is rendered harmless by physical changes brought about by gasification. By this means, asbestos may be safely disposed of without polluting the environment. Further, synthesis gas, reducing gas., or fuel gas, depending on the gas composition, is simultaneously produced.

SUMMARY OF THE INVENTION

This invention relates to a method of disposing of asbestos-containing materials while simultaneously producing a gaseous mixture comprising $H_2+CO$ comprising the steps of: (1) introducing asbestos-containing material into the reaction zone of a free-flow unobstructed refractory-lined partial oxidation gas generator simultaneously with an ash-containing liquid hydrocarbonaceous fuel and/or solid carbonaceous fuel, a free-oxygen containing gas, and a temperature moderator; wherein the weight ratio of asbestos-containing materials to ash in the liquid hydrocarbonaceous and/or solid carbonaceous fuel is in the range of about 0.1 to 10; (2) reacting said fuel in said reaction zone at a temperature which is at least about 10° to 200° F. above the fluid temperature of the ash in the fuel and at least above about 2000° F. and a pressure in the range of about 2 to 250 atmospheres, a free O/C atomic ratio in the range of about 0.7 to 1.6, and a weight ratio of $H_2O$ to fuel in the range, of about 0.2 to 2.0 to produce a hot raw effluent gas stream comprising $H_2$, CO, $CO_2$ and at least one gas from the group $H_2O$, $N_2$, $CH_2$, $H_2S$, COS and Ar; entrained molten slag, and particulate matter; wherein the asbestos in the reaction zone melts and is rendered harmless and combines with the ash from said fuel to produce said molten slag; and (3) cooling and cleaning the raw effluent gas stream from (2).

DISCLOSURE OF THE INVENTION

This invention relates to a method of disposing of asbestos-containing materials while simultaneously producing gaseous mixtures comprising $H_2+CO$ e.g. synthesis gas, reducing gas, or fuel gas depending on the gas composition. Either relatively pure asbestos or asbestos-containing materials can be treated by the subject process. In the subject process, all species of asbestos-containing waste materials are rendered harmless by the high temperature produced by the partial oxidation reaction. The physical form of the asbestos fibers is thermally altered; and, the altered asbestos is then incorporated into the molten slag phase.

The expression asbestos-containing material includes by definition relatively pure asbestos or asbestos-containing materials, such as asbestos in combination with organic materials, inorganic materials, and mixtures thereof. Asbestos-containing materials may contain from about 0.5 to 100 wt. % asbestos. Asbestos is a generic term describing a variety of naturally formed hydrated silicates that may be separated into layers of mineral fibers. Asbestos may be classified as Serpentine or Amphibole. Serpentine asbestos is of the chrysotile specie. The Amphiboles include five species: anthophyllite, amosite, crocidolite, actinolite, and tremolite. The chemical composition of these materials are shown in Table I.

TABLE I

| Species | Variety | ASBESTOS Chemical Composition |
|---|---|---|
| chrysotile | serpentine | $3MgO.2SiO_2.2H_2O$ |
| anthophyllite | amphibole | $7MgO.8SiO_2.H_2O$ |
| amosite | amphibole | $11FeO.3MgO.16SiO_2.2H_2O$ |
| actinolite | amphibole | $2CaO.4MgO.FeO.8SiO_2.H_2O$ |
| tremolite | amphibole | $2CaO.5MgO.8SiO_2.H_2O$ |
| crocidolite | amphibole | $Na_2O.Fe_2O_3.3FeO.8SiO_2.H_2O$ |

By definition, the term ash-containing liquid hydrocarbonaceous material or fuel is a petroleum or coal derived fuel selected from the group consisting of virgin crude, reduced crude, vacuum tower bottoms or feeds, residual fuel oil, heavy fuel oil slurry, asphalt, tar sands bitumen, shale oil, coal derived oil, and mixtures thereof.

By definition ash-containing solid carbonaceous fuels are selected from the group consisting of coals including anthracite, bituminous, sub-bituminous, lignite, coke from coal, petroleum coke, soot, tar sand, pitch, and mixtures thereof.

By definition, ash from liquid hydrocarbonaceous fuel or solid carbonaceous fuel comprises mostly the oxides and possibly the sulfides of Ni, V, Fe, and Ca along with the oxides of Al and Si, and a minor amount of the oxides selected from the group consisting of Ti, Cr, and mixtures thereof. The ash content of these materials is in the range of about 0.1 to 30 weight percent.

A preferred embodiment of the subject invention involves mixing the ground asbestos-containing material with ash-containing liquid hydrocarbonaceous fuel, or comminuted ash-containing solid carbonaceous material, or both and introducing the mixture into the partial oxidation gasifier. In another embodiment the ground asbestos-containing material is mixed with the liquid hydrocarbonaceous material and first fed into a coker. By this means, the finely ground asbestos-containing material may be intimately distributed throughout the petroleum coke product. The petroleum coke contains uniformly dispersed therein sufficient ground asbestos-containing material to provide a weight ratio of asbestos to the ash in the ash-containing fuel in the range of about 0.1 to 10.0. The preferable particle size of the mixture of ground asbestos-containing material, the comminuted ash-containing solid carbonaceous fuel and mixtures thereof is a size range such that at least 90 wt % of the material passes through a No. 35 sieve of the ASTM E-11 Standard Sieve Designation (500 microns) and at least 30 Wt % of the material passes through a No. 325 sieve of that same Series (44 microns). In another embodiment, the ash-containing solid carbonaceous fuel is ground together with the asbestos-containing material to the aforesaid particle size. Intimate mixing of the materials is thereby achieved, and the particle sizes of each material are substantially the same. The ground mixture is then mixed with water or a liquid hydrocarbonaceous material or both to produce a pumpable slurry. Alternatively, the solid materials may be wet ground with the liquid slurry medium. This slurry is then introduced into a partial oxidation gasifier.

The mixture of ground asbestos-containing material and ground ash-containing solid carbonaceous fuel, for example as said slurry, is introduced into the free-flow partial oxidation reaction zone. At an autogenous temperature which is at least about 10° F. to 200° F. above the fluid temperature of the ash in the fuel and at least above about 2000° F. and at a pressure in the range of about 2 to 250 atmospheres, the fuel reacts in the gasifier with a free-oxygen containing gas in the presence of a temperature moderator to produce a hot raw effluent gas stream comprising $H_2+CO$ e.g. synthesis gas, along with molten ash. Preferably, the mixture of ground asbestos-containing material and ash-containing fuel is introduced into the gasifier as a pumpable slurry including water or liquid hydrocarbonaceous fluid, or mixtures thereof. The solids content of the slurry is in the range of about 50–68 weight percent. Alternatively, the mixture may be entrained in a gaseous transport medium. The gaseous transport medium may be selected from the group consisting of steam, $CO_2$, $N_2$, free-oxygen containing gas, and recycle synthesis gas.

In the embodiment where ground asbestos-containing material is mixed together with ash-containing liquid hydrocarbonaceous fuel and fed into a coker, the actual operation can be accomplished, for example, by mixing the ground asbestos-containing material with the ash-containing petroleum liquid feed to a vacuum distillation tower, which normally precedes the coker unit. In either unit operation (coking or distillation), the ground asbestos-containing material should predominately stay behind in the desired bottoms stream. In other words, there should be little, if any, carry over of ground asbestos-containing material with the lighter products. A possible advantage for mixing the ground asbestos-containing material into the vacuum tower feed stream in preference to the bottoms stream (i.e. coker feed) is that the feed to the vacuum tower is significantly less viscous than the bottoms from the vacuum tower. A more thorough mixing may be thereby effected.

In one embodiment, a mixture of high boiling liquid petroleum i.e. liquid hydrocarbonaceous fuel and ground asbestos-containing material at a temperature in the range of about 650° F. to 930° F. is introduced into a delayed coking zone, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke is removed from the bottom of said delayed coking zone. Alternatively, the mixture of high boiling liquid petroleum and ground asbestos-containing material at a temperature in the range of about 550° F. to 750° F. may be introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone. The petroleum coke containing asbestos-containing material thoroughly disseminated throughout is ground to a size range such that at least 90 wt % of the material passes through a No. 35 sieve of the ATM E-11 Standard Sieve Designation (500 microns) and at least 30 wt % of the material passes through a No. 325 sieve of that same Series (44 microns). Slurries of the ground petroleum coke are introduced into the partial oxidation gas generator for the production of gaseous mixtures comprising $H_2+CO$ and entrained molten slag containing the asbestos whose physcal form has been rendered harmless.

Another aspect of this invention is that the asbestos may act to produce more and/or a better quality of light products from the coker operation. It may also aid in the gasification reactions either by increasing the reaction rate and thus the throughput capacity of the gasifier or by increasing the conversion of the soot and thus the overall efficiency of the process. However, this invention does not depend on the catalytic properties of the asbestos.

In the partial oxidation reaction zone, the weight ratio of asbestos to ash in the ash-containing fuel comprising liquid hydrocarbonaceous fuel and/or solid carbonaceous fuel is in the range of about 0.1 to 10, such as about 1 to 3. In the aforesaid ratio, the ash-containing fuel to be analyzed for ash is ashed under standard conditions and ignited to constant weight e.g. American Society For Testing and Materials (ASTM) D482 and D3686.

A supplemental temperature moderator to moderate the temperature in the partial oxidation reaction zone may be optionally used. A supplemental temperature moderator is not generally required with water slurries, since the water serves as a temperature moderator. Suitable temperature moderators include superheated steam, saturated steam, unsaturated steam, water, $CO_2$-rich gas, a portion of the cooled exhaust from a turbine employed downstream in the process, nitrogen in air, by-product nitrogen from a conventional air separation unit, or cooled synthesis gas and mixtures of the aforesaid temperature moderators. The temperature moderator may be introduced to the partial oxidation reaction zone in admixture with either the fuel, the free-oxygen containing gas, or both. Alternatively, the temperature moderator may be introduced into the reaction zone of the gas generator by way of a separate conduit in the burner.

The term free-oxygen containing gas, as used herein is intended to include air, oxygen-enriched air, i.e. greater than 21 mole % oxygen, and substantially pure oxygen, i.e. greater than 95 mole % oxygen, (the remainder comprising $N_2$ and rare gases). Free-oxygen containing gas may be introduced into the burner at a temperature in the range of about ambient to 1300° F.

Any conventional means may be used for introducing the mixture of asbestos and fuel into the reaction zone of a free-flow partial oxidation gas generator. For example, a suitable burner is shown in coassigned U.S. Pat. No. 4,443,230. An extruder for feeding finely divided solids into a gasifier is shown in coassigned U.S. Pat. No. 4,218,222. Conventional partial oxidation reactors may be used in the subject process. A suitable partial oxidation. apparatus is shown in coassigned U.S. Pat. No. 4,289,502. The latter three coassigned U.S. Patents are incorporated herein by reference.

The partial oxidation reaction takes place within the free-flow refractory lined reaction zone of the gas generator at a temperature which is high enough to keep the ash produced in the molten state. The ratio of the atoms of free-oxygen containing gas per atom of carbon in the solid carbonaceous fuel (O/C atomic ratio) may be in the range of about 0.7 to 1.6, such as about 0.8 to 1.1. With water as the temperature moderator, the weight ratio of $H_2O$ to the solid carbonaceous fuel feed is in the range of about 0.2 to 2.0, such as about 0.47 to 0.72. A raw effluent stream of synthesis gas, reducing gas, or fuel gas leaving the reaction zone of the free-flow gas generator comprises the following in mole % dry basis with substantially pure oxygen feed: $H_2$ 25 to 50, CO 30 to 55, $CO_2$ 5 to 30, $CH_4$ nil to 3, $H_2S+COS$ 0.5 to 5, $N_2$ nil to 5.0, Ar nil to 1.5, $NH_3$ nil to 1, entrained particulate matter, e.g. particulate carbon soot, and molten ash comprising molten ash from said fuel in combination with molten asbestos which has been rendered harmless. $H_2O$ as steam, is always present in the raw effluent gas stream.

The hot raw effluent gas stream is discharged from the vertical reaction zone, preferably downward through a bottom outlet located along the central longitudinal axis of the gas generator and then cooled and cleaned. Any suitable method or combination of methods for cooling the raw gas stream and removing at least a portion, e.g. about 10 to 100 wt. % of the entrained particulate matter and molten ash may be used. In a preferred embodiment, all of the hot raw effluent gas stream from the reaction zone may be quench cooled and cleaned by being passed through a, dip tube that terminates beneath the surface of a pool of quench water contained in the bottom of a quench tank located below the reaction zone. A typical quench tank is shown in coassigned U.S. Pat. No. 4,218,423, which is incorporated herein by reference. The particles of molten slag solidify in the quench water and are separated from the raw gas stream along with the other particulate solids, e.g. carbon, soot by the turbulence created when the effluent gas stream passes through the body of quench water. The cooled and at least partially cleaned raw effluent gas stream is then discharged through an outlet in the side wall near the top of the quench tank. The solidified slag particles may be then removed along with some quench water through an outlet in the bottom of the quench tank and a lockhopper system such as shown in coassigned U.S. Pat. No. 4,247,302 and safely disposed of without polluting the environment. In one embodiment, at least a portion e.g. about 10 to 100 wt % of the slag is ground and recycled to the reaction zone of the reference, as well as coassigned U.S. Pat. Nos. 4,328,006 and 4,377,132 depict other typical processes and apparatus for cooling the raw gas stream from the partial oxidation gas generator by indirect heat exchange, and separating combustion residue, e.g. molten slag and/or particulate solids from the gas stream. These coassigned U.S. Patents are incorporated herein by reference.

The quench cooled and at least partially cleaned raw gas stream may be further cleaned in a conventional gas scrubbing zone by being contacted with scrubbing liquid, typically water, at a temperature in the range of about 300° F.-500° F., say about 400° F. During gas quenching and scrubbing, the raw gas picks up water vapor so that the mole ratio of raw gas to water, may be in the range of about 0.5-2:1, say about 1:1.

The raw gas stream exiting the gas scrubber can be further processed by water-gas shift conversion to produce hydrogen. Alternatively, the gas can be used as fuel gas, reducing gas or for chemical synthesis. $H_2S$ and COS in the cleaned raw gas stream may be removed by conventional processing, e.g., rectisol, selexol, sulfinol. These sulfur containing gases can be then further processed in a Claus unit to recover by-product elemental sulfur.

Although this invention has been illustrated by reference to specific embodiments, it will be apparent to those skilled in the art that various changes and modifications may be made which clearly fall within the scope of this invention.

I claim:

1. A method of disposing of asbestos-containing materials while simultaneously producing a gaseous mixture comprising $H_2+CO$ comprising:
   (1) introducing asbestos-containing material into the reaction zone of a free-flow unobstructed refractory lined partial oxidation gas generator simulaneously with an ash-containing liquid hydrocarbonaceous fuel and/or solid carbonaceous fuel, a free-oxygen containing gas, and a temperature moderator; wherein the weight ratio of asbestos-containing material to ash in the liquid hydrocarbonaceous and/or solid carbonaceous fuel is in the range of about 0.1 to 10;
   (2) reacting said fuel in said reaction zone at a temperature which is at least about 10° to 200° F. above the fluid temperature of the ash in the fuel and above about 2000° F. and a pressure in the range of about 2 to 250 atmospheres, an O/C atomic ratio in the range of about 0.7 to 1.6, and a weight ratio of $H_2O$ to fuel in the range of about 0.2 to 2.0 to produce a hot raw effluent gas stream comprising $H_2$, CO, $CO_2$ and at least one gas from the group $H_2O$, $N_2$, $CH_4$, $H_2S$, COS and Ar; entrained molten slag, and particulate matter; wherein the asbestos in the reaction zone melts and combines with the ash from said fuel to produce molten slag containing asbestos which has been rendered harmless; and (3) cooling and cleaning the raw effluent gas stream from (2).

2. The process of claim 1 provided with the steps of grinding together said asbestos-containing material and ash-containing liquid hydrocarbonaceous fuel and/or solid carbonaceous fuel to a size range such tha at least 90 wt % of the material passes through a No. 35 sieve of the ASTM E-11 Standard Sieve Designation (500 microns) and at least 30 wt % of the material passes through a No. 325 sieve of that same Series (44 microns); and introducing the ground mixture into said reaction zone entrained in a liquid or gaseous carrier.

3. The process of claim 2 wherein said liquid carrier is selected from the group consisting of water, liquid hydrocarbonaceous fuel, and mixtures thereof 4. The process of claim 2 wherein said gaseous carrier is selected from the group consisting of steam, nitrogen, $CO_2$, recycle product gas, and mixtures thereof.

5. The process of claim provided with the step of quench cooling the hot raw effluent gas stream from step (2) in water contained in a quench tank thereby solidifying said molten slag, and cleaning the gas stream with a liquid scrubbing agent in a gas scrubber.

6. The process of claim 5 wherein said fuel is an ash-containing liquid hydrocarbonaceous fuel and/or petroleum coke, and said asbestos-containing material contains iron and/or calcium; and provided with the steps of recovering slag from said quench water and grinding same, and recycling at least a portion of the ground slag to the reaction zone in (1) in admixture with fresh fuel feed.

7. A method of disposing of asbestos-containing materials while simultaneously producing a gaseous mixture comprising $H_2 + CO$ comprising:

(1) mixing together asbestos-containing material and ash-containing liquid hydrocarbonaceous fuel so that the weight ratio of said asbestos-containing material to ash in said ash-containing fuel is in the range of about 0.1 to 10.0;

(2) coking said mixture of asbestos-containing material and ash-containing liquid hydrocarbonaceous fuel from (1) to produce petroleum coke containing asbestos dispersed therein; and (3) reacting said petroleum coke from (2) in a free-flow partial oxidation reaction zone with a free-oxygen containing gas in the presence of a temperature moderator to produce a hot raw effluent gas stream comprising $H_2 + CO$ along with molten ash; wherein the asbestos in the reaction zone melts and combines with the ash from said fuel and is thereby rendered harmless; and (4) cooling and cleaning the raw effluent gas stream from (3).

8. The process of claim 7 wherein the size range of the asbestos-containing material in (1) is such that at least 90 wt % of the material passes through a No. 35 sieve of the ASTM E-11 Standard Sieve Designation (500 microns) and at least 30 wt % of the material passes through a No. 325 sieve of that same Series (44 microns).

9. The process of claim 7 wherein said ash-containing liquid hydrocarbonaceous fuel is selected from the group consisting of virgin crude, reduced crude, residual fuel oil, heavy fuel oil slurry, asphalt, tar sands bitumen, shale oil, coal derived oil, and mixtures thereof.

10. The process of claim 7 wherein said ash-containing liquid hydrocarbonaceous fuel is a high boiling liquid petroleum feed to or the bottoms from a vacuum tower or a fractionator.

11. The process of claim 7 provided with the step of separating said molten ash from the hot raw effluent gas stream in (4).

12. The process of claim 7 wherein the petroleum coke from (2) is introduced into the free-flow partial oxidation reaction zone in (3) as a pumpable slurry of petroleum coke in water, liquid hydrocarbonaceous fuel or mixtures thereof, or said petroleum coke from (2) may be entrained in a gaseous transport medium.

13. The process of claim 7 where in (2) the mixture of ash-containing liquid hydrocarbonaceous fuel and asbestos-containing material at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead, and said petroleum coke containing asbestos dispersed therein is removed from the bottom.

14. The process of claim 7 where in (2) the mixture of ash-containing liquid hydrocarbonaceous fuel and asbestos-containing material at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead, and said petroleum coke containing asbestos dispersed therein is removed from the bottom.

15. The process of claim 7 provided with the steps of quench cooling the hot raw effluent gas stream from step (3) in water contained in a quench tank thereby solidifying said molten slag; recovering slag from said quench water and grinding same; and recycling at least a portion of the ground slag to the reaction zone in (3) in admixture with fresh fuel feed.

* * * * *